March 18, 1969     H. PINZKE     3,432,953
DISPLAY STAND AND METHOD FOR MAKING SAME
Filed Feb. 6, 1967     Sheet _1_ of 2
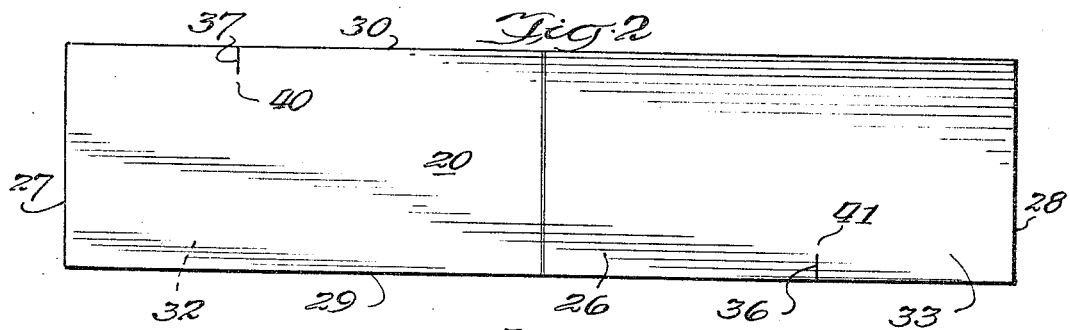
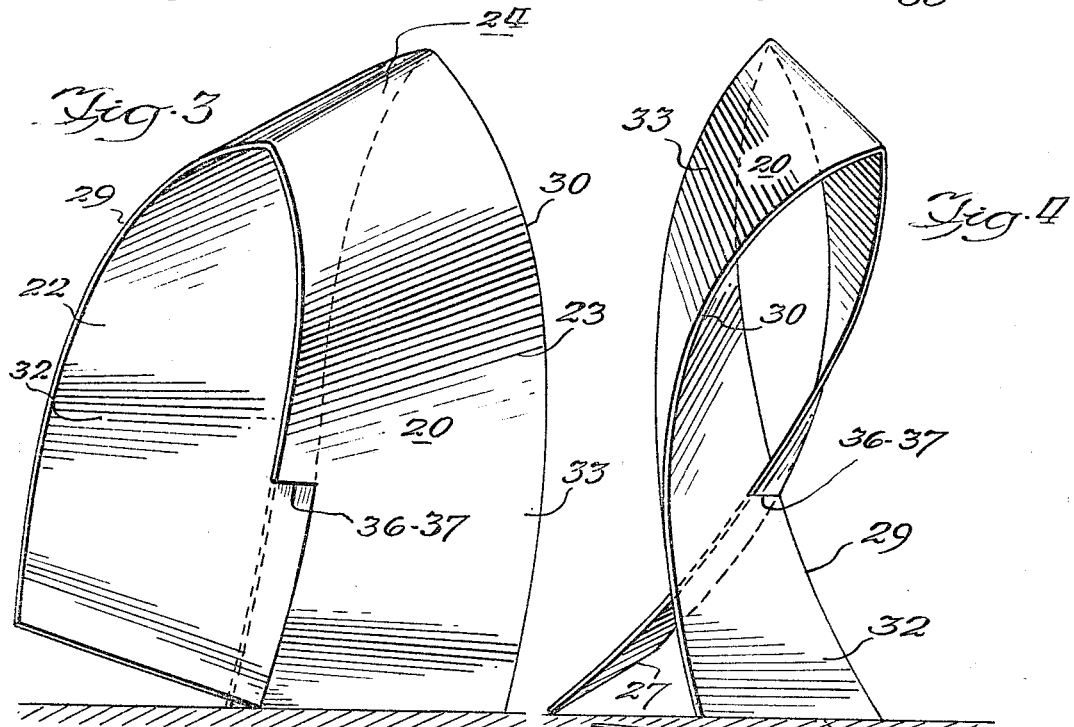
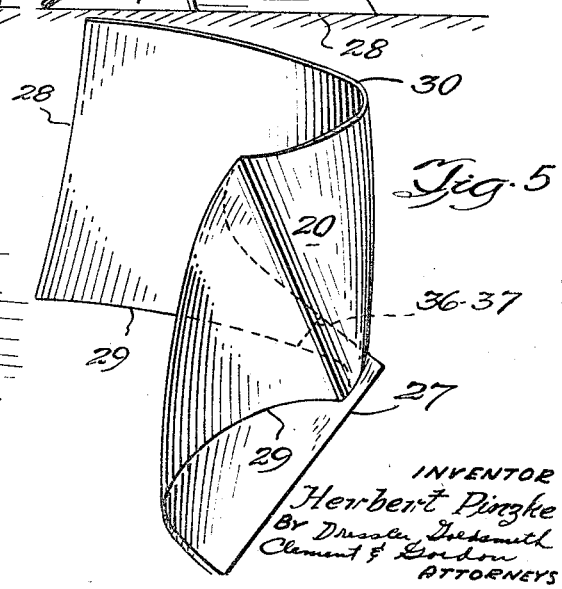
INVENTOR
Herbert Pinzke
BY Dressler, Goldsmith, Clement & Gordon
ATTORNEYS

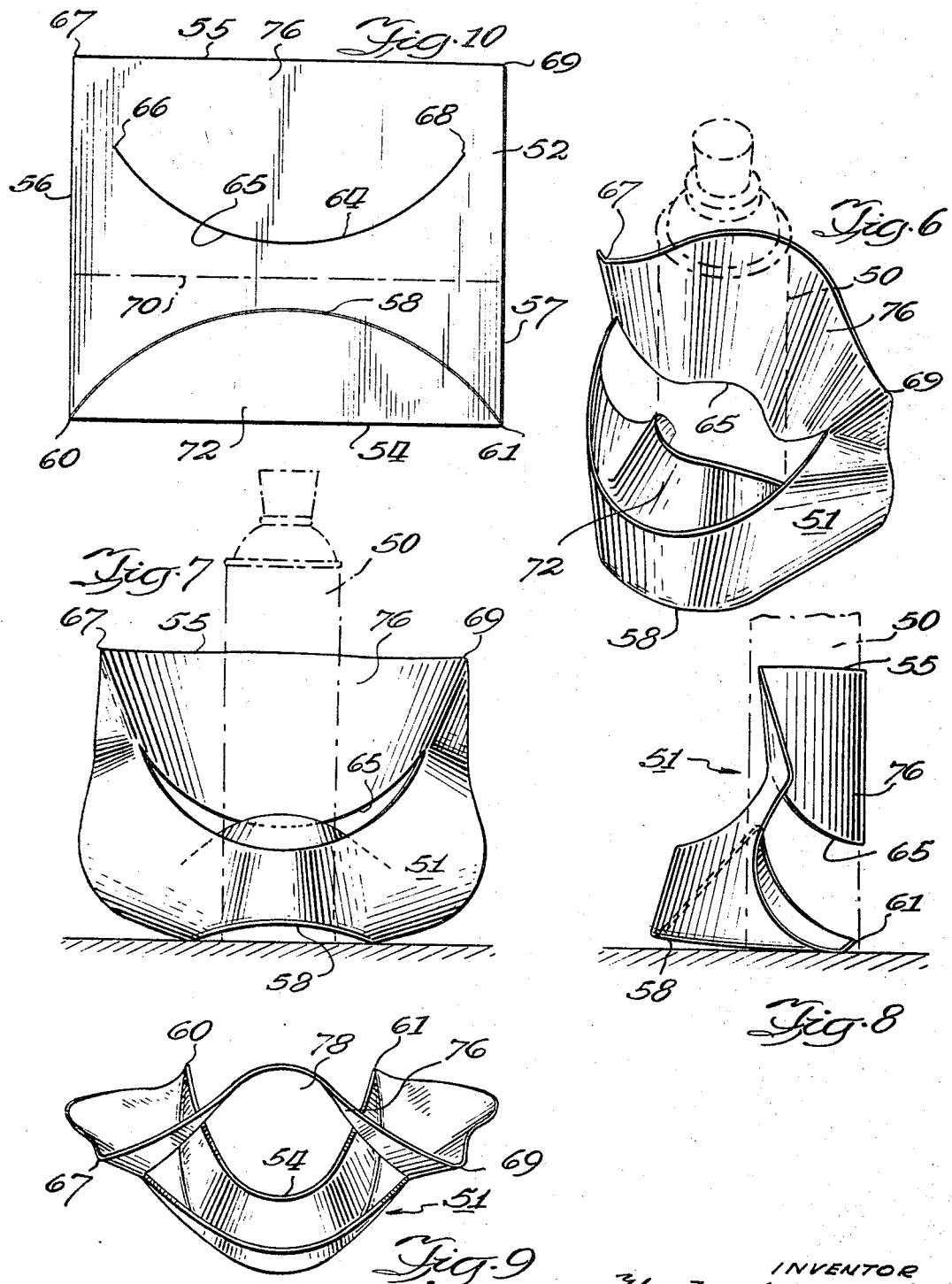

United States Patent Office 3,432,953
Patented Mar. 18, 1969

3,432,953
DISPLAY STAND AND METHOD FOR MAKING SAME
Herbert Pinzke, 28W511 Highland Road,
West Chicago, Ill. 60185
Filed Feb. 6, 1967, Ser. No. 614,321
U.S. Cl. 40—124.1
Int. Cl. G09f 1/00
8 Claims

ABSTRACT OF THE DISCLOSURE

A display stand formed of an elongated sheet member which is bent to provide two depending, intersecting legs, and a method of making such display stands.

---

This invention relates to display stands which are very simple to produce, have superior portability and are attractive in appearance, and methods for making the same.

In accordance with the present invention, there is provided a unitary display stand structure which comprises an elongated sheet member of structurally stable convolute form providing a reverse bend apex portion and support leg portions curving downwardly therefrom in partly overlapping intersecting relation. In the illustrated embodiment of the invention, the elongated sheet member has a transverse slot opening through each side edge to intermesh with each other and interlock the support leg portions.

The display stand of one embodiment of the present invention is made by cutting a body of structurally stable sheet material to provide an elongated member having two side edges, forming a transverse slot opening on each one of the side edges of the member, and bending the member so that the wall defining each of the slot openings is engaging a portion of the member adjacent the other slot opening, to thereby provide a reverse bend apex portion and support leg portions curving downwardly therefrom.

A more detailed explanation of the invention is provided in the following description and claims, and is illustrated in the accompanying drawings, in which:

FIGURE 1 is a perspective view of a display stand in accordance with the present invention, in a typical environment;

FIG. 2 is a layout view of the display stand of FIG. 1;
FIG. 3 is a front elevational view of the display stand of FIG. 1;
FIG. 4 is a side elevational view of the display stand of FIG. 1;
FIG. 5 is a top plan view of the display stand of FIG. 1;
FIG. 6 is a perspective view of a second embodiment of the invention, with the display stand illustrated in full lines and an associated container illustrated in phantom;
FIG. 7 is a front elevational view of the display stand of FIG. 6;
FIG. 8 is a side elevational view of the display stand of FIG. 6;
FIG. 9 is a top plan view of the display stand of FIG. 6; and
FIG. 10 is a layout view of the display stand of FIG. 6.

Referring to the drawings, in FIG. 1 display stands 20 are shown in a typical environment, in a store window display. As seen in FIGURES 3 to 5, the display stand 20 includes support leg portions 22 and 23 which curve downwardly from a reverse bend apex portion 24, whereby the form has a side elevational configuration (FIGURE 4) generally resembling an inverted Greek letter "gamma" (in lower case). The leg portions 22 and 23 are symmetrical with respect to an imaginary plane perpendicular to the surface on which the stand is resting.

The display stand 20 is formed of a rectangular member of sheet material 26 having a first end 27, a second end 28, a first side 29, a second side 30, an inside surface 32 bordered by sides 27–30 and an outside surface 33 bordered by the same sides.

An elongated slot opening 36 is provided on the first side 29 at a location approximately one-fifth the distance from the second end 28 to the first end 27, and an elongated slot opening 37 is provided on the second side 30 at a location approximately one-fifth the distance from the first end 27 to the second end 28.

Opening 36 extends one-sixth of the distance from the first side 29 to the second side 30 and opening 37 extends one-sixth of the distance from the second side 30 to the first side 29. It is preferred that the openings 36 and 37 extend less than twenty percent of the distance between the respective sides and the respective opposite sides, in order to provide a more pleasing appearance and so that the structure will not be unduly curved, making it difficult to view the matter being displayed.

To form the display stand illustrated in FIGURES 1, 3, 4 and 5, the flexible sheet member 26 is bent so that opening 36 engages a portion 40 adjacent opening 37 and opening 37 engages a portion 41 adjacent opening 36. A stand including legs 22 and 23 will be formed and at least part of each of the ends 27 and 28 will be in contact with the surface upon which the stand is resting.

The display stand formed is attractive in appearance and is extremely portable. The unique, curved, flowing lines of the display stand will attract attention, and the stand is suitable for various types of advertising and display purposes. For example, as shown in FIGURE 1, photographs may be affixed to the stand 20. Of course, various graphic representation and copy may be affixed and printed on the stand.

In the illustrated embodiment, the ends 27 and 28 are perpendicular to the sides 29 and 30, and hence only portions thereof contact the surface upon which the display stand is resting.

In this manner, the upright display stand will have a tendency to sway if it is in the path of a breeze. Such swaying movement is eye-catching and enhances the appeal of the structure.

A large number of the display stands can be moved easily from place to place. To accomplish this purpose, one merely needs to disconnect leg 22 from leg 23, and fold the members so that the inside surface of leg 22 faces the inside surface of leg 23 and the unit is flat. It is apparent that a large amount of display stands can be stored in a relatively small amount of space.

The display stand illustrated in FIGURES 6 to 10 is useful in connection with displaying various types of containers, such as the aerosol-type container 50 shown in phantom. To form the illustrated display stand 51, a body of flexible, structurally stable sheet material 52 is cut to provide a rectangular member having a first end 54, a second end 55, a first side 56 and a second side 57. An arcuate line is scored from the intersection 60 to the intersection 61 and an arcuate cut is made. As used in the specification and claims herein, the term "cut" is defined as any severance of matter.

The cut 64 extends from a point 66 adjacent the intersection 67 to a point 68 adjacent intersection 69. The arcuate scored line 58 and cut 64 are symmetrical with respect to an imaginary line 70 extending from side 56 to side 57 in parallel with side 54.

To form the display stand 51, the portion 72 defined by line 58 and side 54 is bent toward cut 64, and the bend is continued until the end 54 has moved past surface 65 of the cut 64 so that the top surface of portion 72 (with respect to FIGURE 10) and the top surface of portion 76 form a receptacle for the container 50. Hence there will be an opening 78 defined by the top surface of portion 72 and the top surface of portion 76, which is formed for the container 50 to be received therein. When the container 50 is inserted into the opening 78, the structure 51 will be held in place by its own formation, and no external fastening members will be necessary.

A large number of the display stands can be moved from place to place and can be stored within a relatively small amount of space. To this end, the structure may remain or be placed back into its planar form as illustrated in FIGURE 10, so that a large number of the members can be stacked.

In addition to the portability and simplicity of forming the display stand illustrated in FIGURES 6 to 9, the stand is very pleasing in appearance because of the smooth, flowing lines, and hence the structure provides an eye-catching display. Various copy or other graphic design may be printed upon the member 52 to advertise or describe the product displayed therein.

Although two illustrative embodiments have been shown and described, it is to be understood that various modifications and substitutions may be made without departing from the novel spirit and scope of the present invention.

What is claimed is:

1. A display stand which comprises: a member of sheet material having a first end, a second end, a first side, a second side; an inside surface bordered by said first end, second end, first side and second side; and an outside surface bordered by said first end, second end, first side and second side; said member being formed so that at least a portion of said first end and at least a portion of said second end are in contact with the surface on which said member is resting; one half of said member forming a first leg of said stand and the other half of said member forming a second leg of said stand, said legs comprising the sole support for said display stand; the upper portion of said inside surface of said first leg being in position to face the upper portion of said inside surface of said second leg; said first side and a first adjacent portion of said member being intermeshed with said second side and a second adjacent portion of said member whereby the portion of said outside surface beneath said intermesh and near said first end is in position to face the portion of said outside surface beneath said intermesh and near said second end; said first leg and said second leg being symmetrical with respect to a plane perpendicular to the surface on which said member is resting, said first side and said first adjacent portion having a first elongated opening and said second side and said second adjacent portion having a second elongated opening, the walls defining said first elongated opening being in engagement with a portion of said member adjacent said second elongated opening and the walls defining said second elongated opening being in engagement with a portion of said member adjacent said first elongated opening, whereby said intermesh is formed.

2. A display stand as described in claim 1 wherein said first and second elongated openings each extend less than twenty percent of the distance between said first and second sides.

3. A unitary display stand structure comprising an elongated sheet member of structurally stable convolute form providing a reverse bend apex portion and support leg portions curving downwardly therefrom in partly overlapping intersecting relation.

4. A unitary display stand structure as described in claim 3, said member having a transverse slot opening through each side edge to intermesh with each other and interlock said support leg portions.

5. A unitary display stand structure as described in claim 4, wherein said form has a side elevational configuration generally resembling an inverted Greek letter "gamma" in lower case.

6. A method of making display stands which comprises the steps of cutting a body of flexible, structurally stable sheet material to form a rectangular member having a first end, a second end, a first side and a second side; scoring an arcuate line from about the intersection of said first side and said first end to about the intersection of said second side and said first end; and cutting said body along an arcuate line symmetrical with respect to said second end.

7. A method of making display stands as described in claim 6, wherein said arcuate lines are symmetrical with respect to a line passing from said first side to said second side and being parallel to said first end.

8. A method of making display stands as described in claim 6, including the step of bending the portion of said sheet material defined by said first end and said scored line to form with the portion of said sheet material intermediate said cut line and said second end, a receptacle opening for a container to be displayed.

References Cited

FOREIGN PATENTS 835,256   9/1938   France.

EUGENE R. CAPOZIO, *Primary Examiner.*

WENCESLAO G. CONTRERAS, *Assistant Examiner.*